United States Patent
Mieno et al.

(10) Patent No.: US 6,463,386 B2
(45) Date of Patent: Oct. 8, 2002

(54) GLOBAL POSITIONING SYSTEM (GPS) AND GPS RECEIVER

(75) Inventors: Masayuki Mieno; Tsunekazu Kimura, both of Tokyo (JP)

(73) Assignee: NEC Corporation (JP)

(*) Notice: Subject to any disclaimer, the term of this patent is extended or adjusted under 35 U.S.C. 154(b) by 0 days.

(21) Appl. No.: 10/006,070

(22) Filed: Dec. 5, 2001

(65) Prior Publication Data
US 2002/0077751 A1 Jun. 20, 2002

(30) Foreign Application Priority Data
Dec. 20, 2000 (JP) ..................... 2000-386585

(51) Int. Cl.⁷ .............................. G01C 21/26
(52) U.S. Cl. ..................................... 701/213
(58) Field of Search ............... 701/213; 73/178 R; 342/357.03, 357.06, 357.09, 357.1, 357.12, 357.13, 358

(56) References Cited

U.S. PATENT DOCUMENTS

| | | | |
|---|---|---|---|
| 4,553,221 A | * 11/1985 | Hyatt | 702/17 |
| 4,581,715 A | * 4/1986 | Hyatt | 708/403 |
| 4,686,655 A | * 8/1987 | Hyatt | 367/41 |
| 5,347,285 A | * 9/1994 | MacDoran et al. | 342/352 |
| 5,434,787 A | * 7/1995 | Okamoto et al. | 342/357.06 |
| 5,499,266 A | * 3/1996 | Yokev et al. | 375/136 |
| 5,546,422 A | * 8/1996 | Yokev et al. | 375/134 |
| 5,870,426 A | * 2/1999 | Yokev et al. | 340/7.21 |
| 5,963,582 A | * 10/1999 | Stansell, Jr. | 370/320 |
| 6,160,841 A | * 12/2000 | Stansell et al. | 375/148 |
| 6,236,365 B1 | * 5/2001 | LeBlanc et al. | 342/450 |
| 6,275,186 B1 | * 8/2001 | Kong | 342/363 |

FOREIGN PATENT DOCUMENTS

| | | |
|---|---|---|
| JP | 08-184451 | 7/1996 |
| JP | 10-261993 | 9/1998 |
| JP | 2000-180203 | 6/2000 |
| WO | WO-9412892 | 6/1994 |
| WO | WO-9714049 | 4/1997 |

* cited by examiner

Primary Examiner—William A. Cuchlinski, Jr.
Assistant Examiner—Olga Hernandez
(74) Attorney, Agent, or Firm—Dickstein, Shapiro, Morin & Oshinsky, LLP (57) ABSTRACT

To enable positional information to be provided even if a signal intensity of a received GPS signal is low by compensating a phase inversion of a navigation message and performing a phase integration over a long period. A base station 20 continuously receives the GPS signal 11 and extracts therefrom information for supporting reception and positioning computation in a GPS receiver 30 and retains the information. The base station 20 transmits the support information to the GPS receiver 30 via a communication line 40 when the GPS receiver needs the information. The base station 20 supports reception time synchronization in the GPS receiver 30. The GPS receiver 30 receives the GPS signal 11, generates an intermediate frequency signal through down-conversion, and then stores an A/D conversion data in a memory unit. In the GPS receiver 30, the GPS signal data stored in the memory unit 33 is subjected to integration with phase of the GPS signals aligned based on the support information (satellite navigation message and phase inversion information) supplied from the base station 20, and then positioning computation is performed using the integral GPS data.

13 Claims, 6 Drawing Sheets

GLOBAL POSITIONING SYSTEM (GPS) AND GPS RECEIVER

BACKGROUND OF THE INVENTION

1. Field of the Invention

The present invention relates to a global positioning system (GPS) and GPS receiver, more particularly, to a GPS and GPS receiver that compensate a phase inversion of a navigation message and conduct a phase integration over a long period to enable positional information to be provided even if a signal intensity of a received GPS signal is low.

2. Description of the Prior Art

A conventional GPS receiver is intended to receive signals at an open site and is significantly restricted in its point of use. Therefore, even if user carries a portable GPS receiver, when user is at a site where reception conditions are not good, such as in a store or at the center of a city, user is required to go out of the store or move to an open site. Thus, a technique has been proposed that, even if a signal intensity of a received GPS signal is low, enables a positioning computation by subjecting the GPS signal to a signal processing such as a phase integration or power integration.

FIG. 6 illustrates an operation of a conventional signal processing. FIG. 6(B) shows an intermediate frequency signal obtained by down-converting the GPS signal. The intermediate frequency signal is a signal in which a set of twenty phase modulation signals referred to as pseudonoise signals is repeated as a unit, and the pseudonoise signal has a repetition period of 1 ms (reference symbols H and L in FIG. 6(A) denote two different phases). As shown in FIG. 6(A), the period of the pseudonoise signal is referred to as an epoch. Twenty pseudonoise signals constitute one bit in a 50-bps broadcast from a GPS satellite. A bit of the navigation message broadcasted by the GPS satellite is represented by the phase inversion of the twenty pseudonoise signals. FIG. 6(B) shows a case where the navigation message is represented by 010. The navigation message includes information required for positioning computation such as details, orbit information, and delay time due to atmosphere of each satellite, health data of satellites, and so on.

Figure 6A:
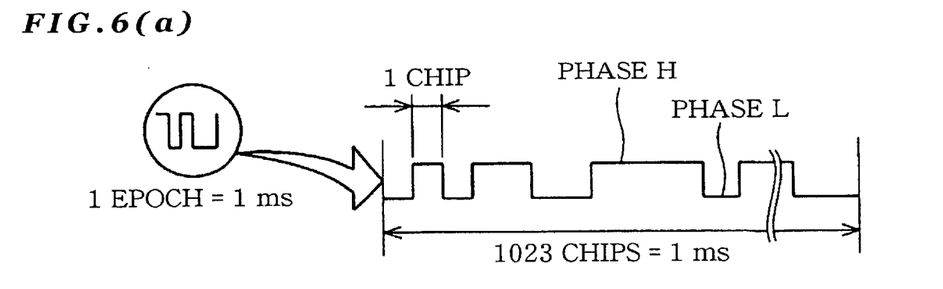
Figure 6B:
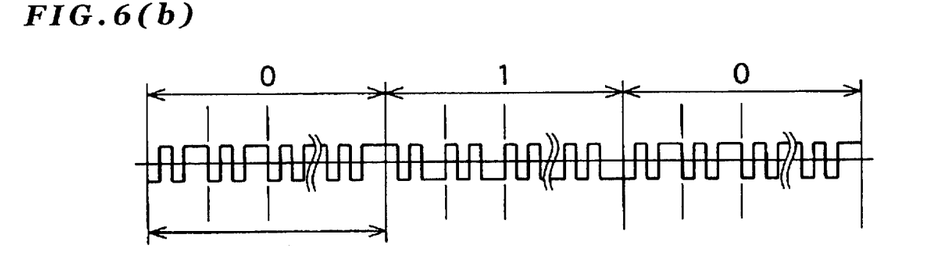
Figure 6C:
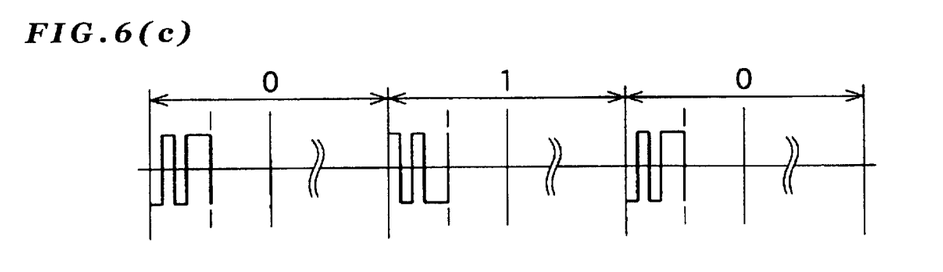
Figure 6D:
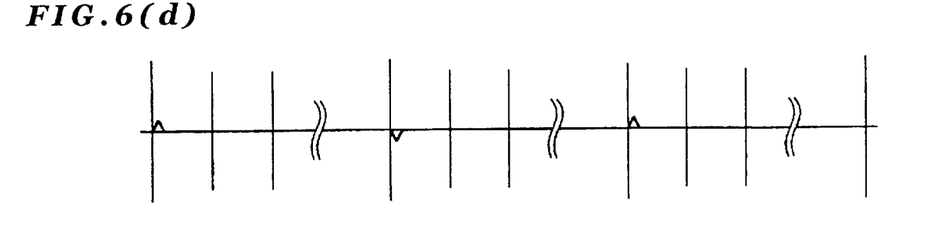

In a conventional process for improving sensitivity, the intermediate frequency signal is divided into blocks each having a length not significantly exceeding 20 ms (referred to as phase integration blocks), each of the phase integration blocks is further divided into sub-blocks each having a length of 1 ms corresponding to one epoch, and then the sub-blocks are added together. As shown in FIG. 6(C), the operations of dividing the signal waveform into the period of 1 ms and of adding the divided waveforms together to form one piece of data are collectively referred to as a phase integration. The phase integration emphasizes the waveform of the pseudonoise signal to improve an SN ratio of the intermediate frequency signal. This is a basic principle of the process for improving sensitivity. A GPS computation unit performs on the phase-integrated intermediate frequency signal a correlation processing with a pseudonoise signal previously generated and retained. As a result, as shown in FIG. 6(D), a phase shift between the received pseudonoise signal and the generated pseudonoise signal appears as a peak position, which is used in the GPS positioning computation.

In a conventional approach for improving sensitivity, due to the phase inversion of the pseudonoise signal of the navigation message, a time of the phase integration that is expected to provide the effect of improving sensitivity is limited to be not more than 20 ms. Therefore, outputs obtained by subjecting outputs of the phase integral to the correlation processing are made to be unsigned through a power processing, a transformation into absolute value, or the like, and then added together to form one piece of data. This operation is referred to as a power integration. In the power integration, the correlation processing is required to be performed for each phase integration block. Since the correlation processing is computation-intensive, the power integration is also computation-intensive, and therefore consumes significant power.

BRIEF SUMMARY OF THE INVENTION

Object of the Invention

The present invention is devised to solve such a problem, and an object of the present invention is to provide a GPS and GPS receiver that compensate a phase inversion of a navigation message and perform a phase integration over a long period to enable positional information to be provided even if a signal intensity of a received GPS signal is low. Furthermore, another object of the present invention is to provide a GPS and GPS receiver that can provide a higher sensitivity than a conventional technique for a same integration time, requires a less integration time than a conventional technique in order to provide the same level of the effect of improving sensitivity, and reduces electric power consumption.

SUMMARY OF THE INVENTION

In order to solve the above-described problem, a GPS receiver according to the present invention comprises a high frequency unit for frequency-converting a received GPS signal to output an intermediate frequency signal, an A/D converter unit for A/D converting the intermediate frequency signal to output intermediate frequency signal sample data, a memory unit for storing the intermediate frequency signal sample data for a predetermined period of time, the data being associated with a time series, a communication unit for communicating with a base station, an integration unit for subjecting the intermediate frequency signal sample data stored in the memory unit to a phase correction based on phase inversion information of a navigation message supplied from the base station, and then performing a phase integration on all of the intermediate frequency signal sample data for the predetermined period of time to output a result of the phase integration, and a GPS computation unit for computing positional information based on the result of the phase integration.

Moreover, a GPS according to the present invention comprises the GPS receiver described above, and a base station for providing the phase inversion information of the navigation message and information for supporting a positioning computation to the GPS receiver.

With the GPS and GPS receiver according to the present invention, the data obtained by sampling the intermediate frequency signal of the GPS signal can be phase-integrated, from its beginning to its end, over a period of time in seconds that is significantly longer than a conventional time of several tens milliseconds. As a result, the SN ratio of the signal can be effectively improved.

Since the power integration is not performed, the process for improving sensitivity does not require any correlation computation. As a result, the computation load involved in the process for improving sensitivity can be significantly reduced compared with the case where the power integration is performed, and therefore, power consumption can be reduced.

Since the GPS receiver is not required to acquire the phase inversion of the pseudonoise signal of the navigation message, the process for improving sensitivity can be performed at any site where the GPS receiver can communicate with the base station.

BRIEF DESCRIPTION OF THE DRAWINGS

FIG. 5 illustrates an operation of the integration unit, FIG. 5(E) showing detailed phase inversion information of a navigation message in synchronization with intermediate frequency signal sample data, FIG. 5(F) showing the intermediate frequency signal sample data subject to phase correction based on the phase inversion information, FIG. 5(G) showing the intermediate frequency signal sample data subject to phase integration, and FIG. 5(H) showing a phase shift between a received pseudonoise signal and a generated pseudonoise signal; and FIG. 6 illustrates an operation of a conventional signal processing, FIG. 6(A) showing a phase modulation signal having a repetition period of 1 ms referred to as a pseudonoise signal, FIG. 6(B) showing the intermediate frequency signal obtained by down-converting a GPS signal, FIG. 6(C) showing the intermediate frequency signal subject to the phase integration, and FIG. 6(D) showing the phase shift between the received pseudonoise signal and the generated pseudonoise signal.

DETAILED DESCRIPTION OF THE PREFERRED EMBODIMENTS

Figure 1:
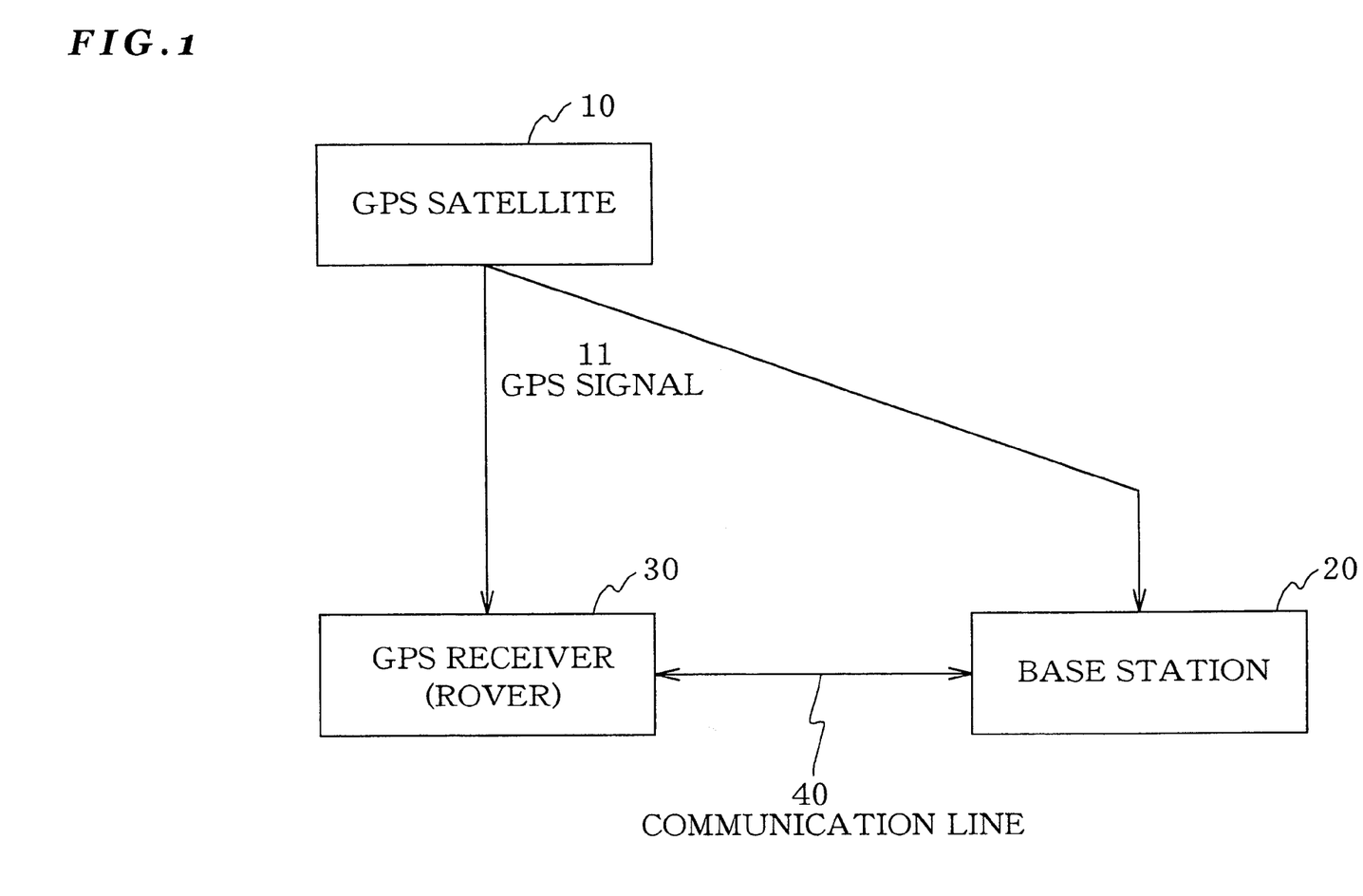
FIG. 1 is a block diagram illustrating a GPS according to the present invention.
Figure 2:
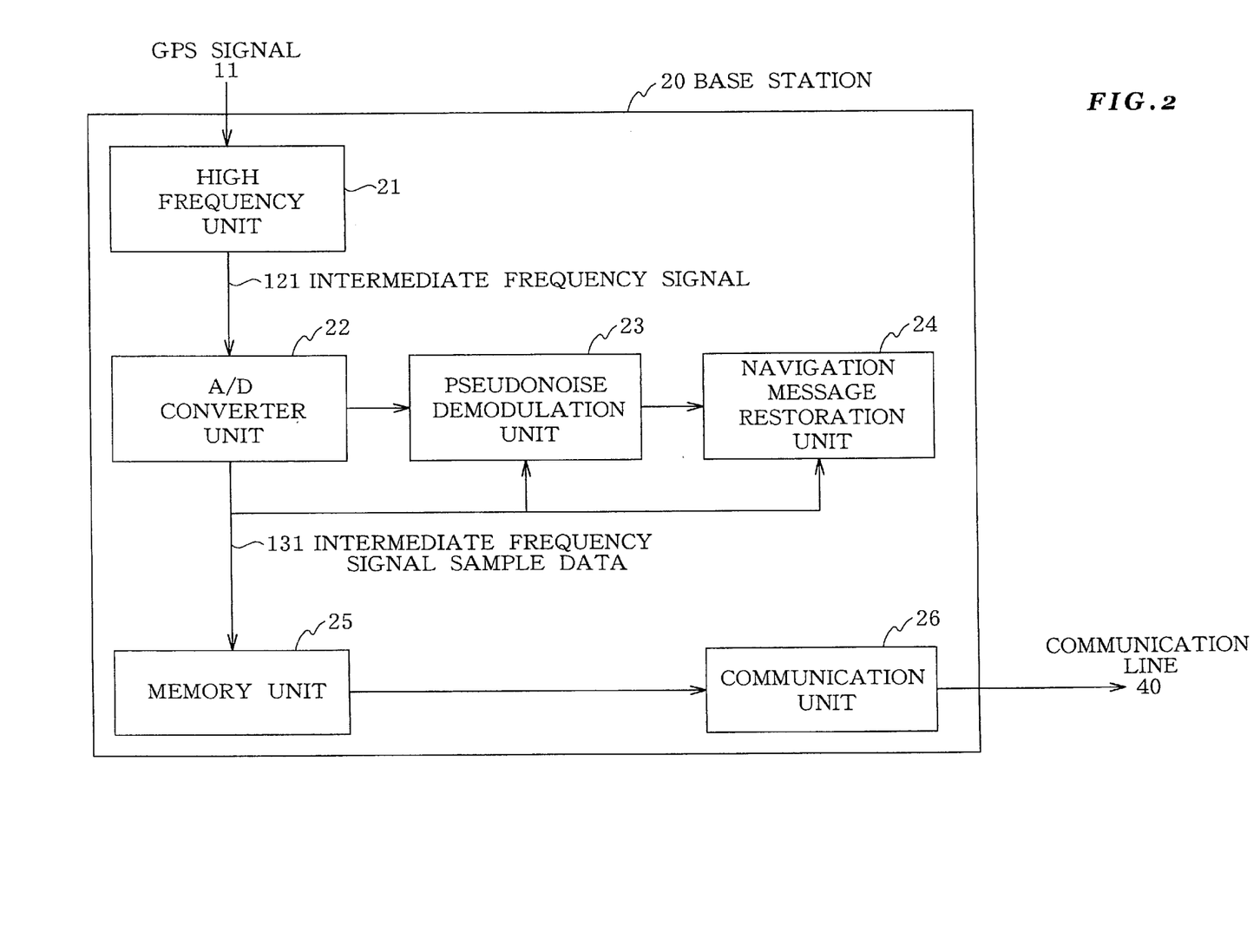
FIG. 2 is a block diagram illustrating a base station according to the present invention.
Figure 3:
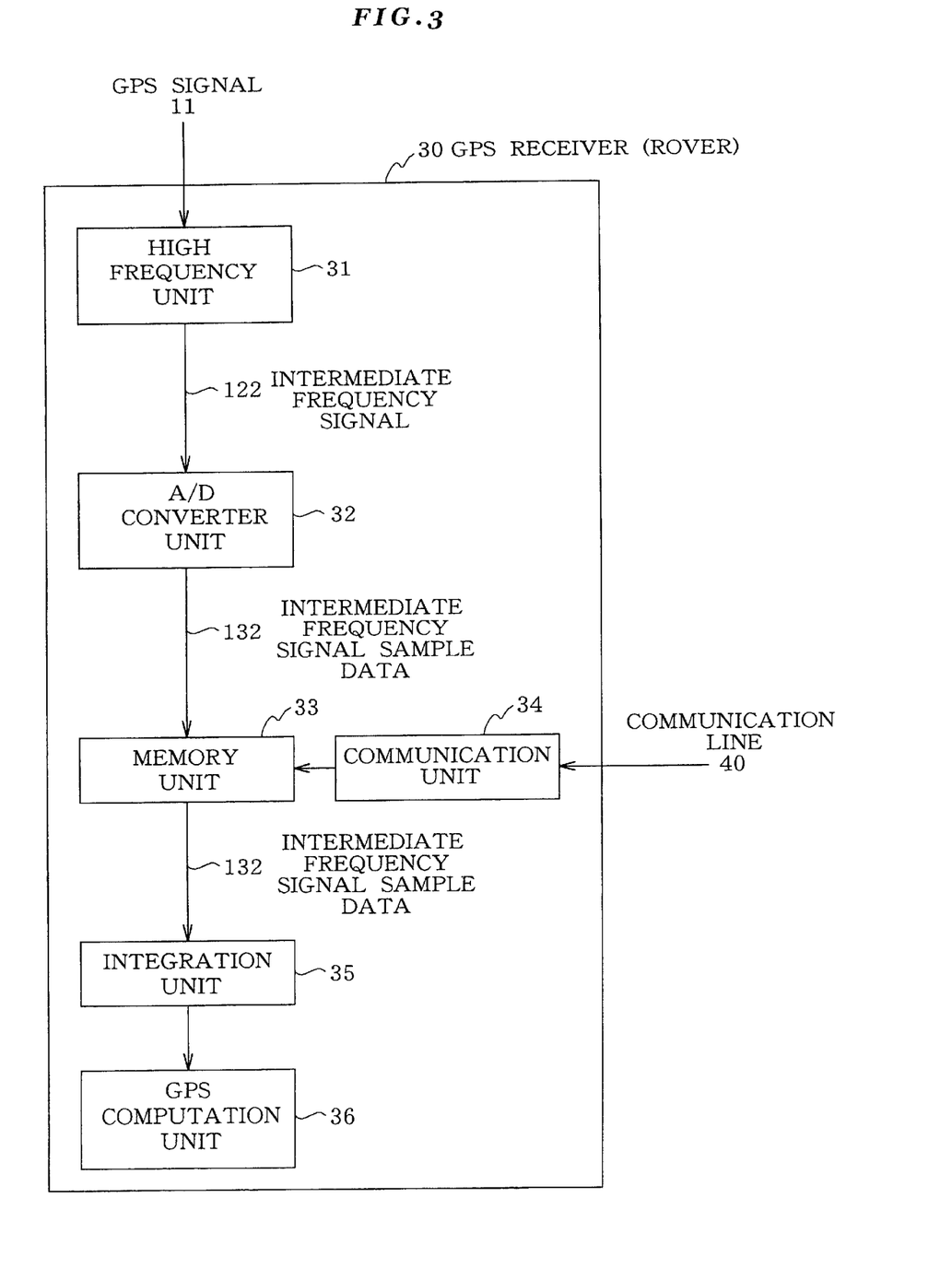
FIG. 3 is a block diagram illustrating a GPS receiver (rover) according to the present invention.
Figure 4:
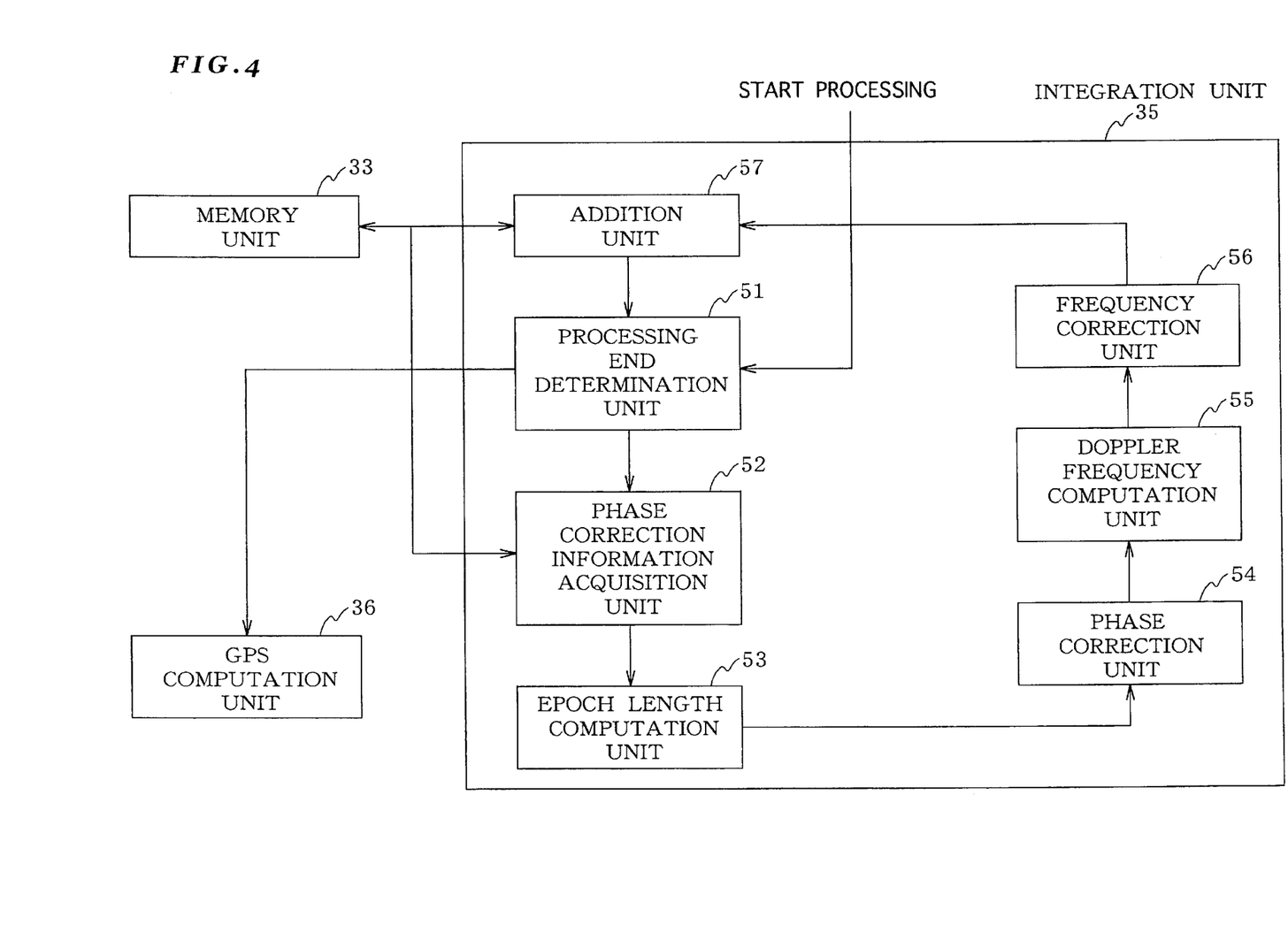
FIG. 4 is a functional block diagram illustrating an integration unit in a GPS receiver (rover) according to the present invention.

Embodiments of the present invention will be described below with reference to the accompanying drawings. FIG. 1 is a block diagram illustrating a GPS according to the present invention, FIG. 2 is a block diagram illustrating a base station according to the present invention, FIG. 3 is a block diagram illustrating a GPS receiver (rover) according to the present invention, FIG. 4 is a functional block diagram illustrating an integration unit in a GPS receiver (rover) according to the present invention, and FIG. 5 illustrates an operation of the integration unit.

As shown in FIG. 1, the GPS of the present embodiment includes a GPS satellite 10, a base station 20, a GPS receiver (rover) 30, and a communication line 40.

The GPS of the present embodiment includes the GPS receiver (rover) 30 that is carried or installed for use by an ordinary user, the base station 20 that provides support information required for the processing for improving sensitivity to the GPS receiver (rover) 30 via the communication line 40 to support the GPS processing computation, and software resident in these units, and is configured so that, even if a GPS signal 11 has been extremely attenuated when the GPS receiver (rover) 30 receives it from the GPS satellite 10, the GPS receiver (rover) 30 can provide positional information to a user by performing code tracking and positioning computation with the support of the base station 20.

The base station 20 continuously receives the GPS signal 11 from the GPS satellite 10 and extracts therefrom information for supporting reception and positioning computation in the GPS receiver (rover) 30 and retains the information. The base station 20 transmits the support information saved continuously for the GPS receiver (rover) 30 to the GPS receiver (rover) 30 via the communication line 40 when the GPS receiver (rover) 30 needs the information. The base station 20 supports reception time synchronization in the GPS receiver (rover) 30.

The GPS receiver (rover) 30 receives the GPS signal 11 from the GPS satellite 10 and generates an intermediate frequency signal 122 by down-converting the GPS signal. The intermediate frequency signal 122 is stored in a memory unit 33 provided in the GPS receiver (rover) 30. In the GPS receiver (rover) 30, the GPS signals 11 stored in the memory unit 33 are integrated with their phases aligned based on the support information transmitted from the base station 20 via the communication line 20. The GPS receiver (rover) 30 performs the positioning computation using the integral GPS data.

As described above, in the GPS of the present embodiment, data of the GPS signals 11 is stored in the memory unit 33 in the GPS receiver (rover) 30 for a long period of time, and the signals are integrated with their phases aligned based on the support information provided by the base station 20, so that the positioning computation can be accomplished using a GPS signal that is too low for a conventional GPS to use for the positioning computation.

Figure 5E:
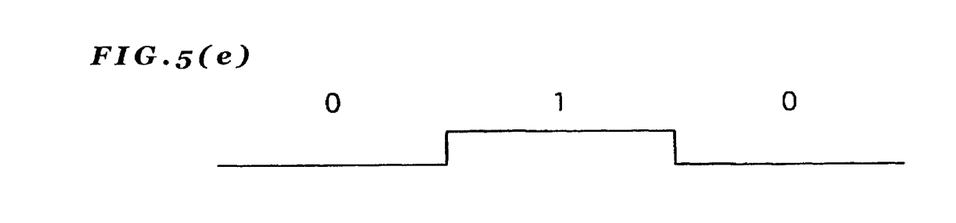
Figure 5F:
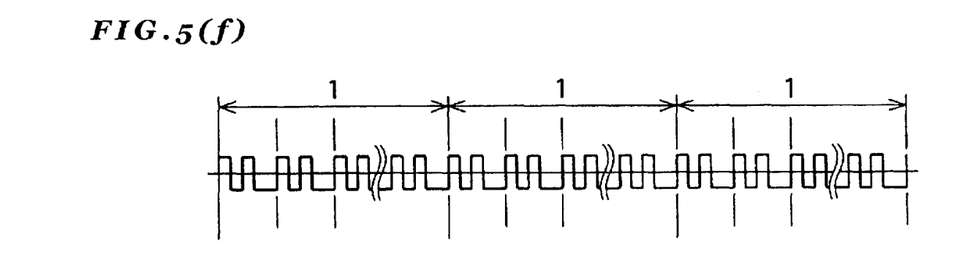
Figure 5G:
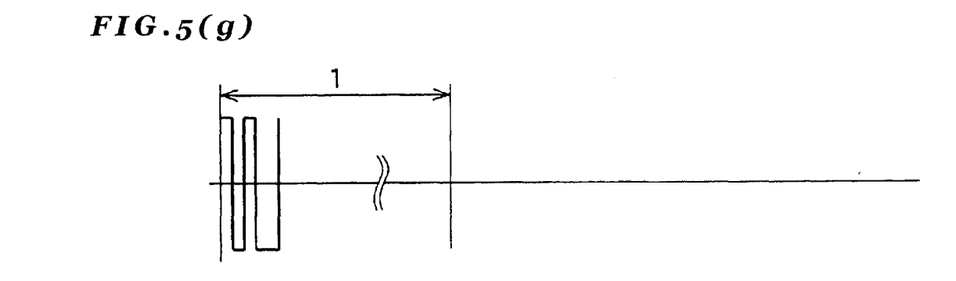
Figure 5H:
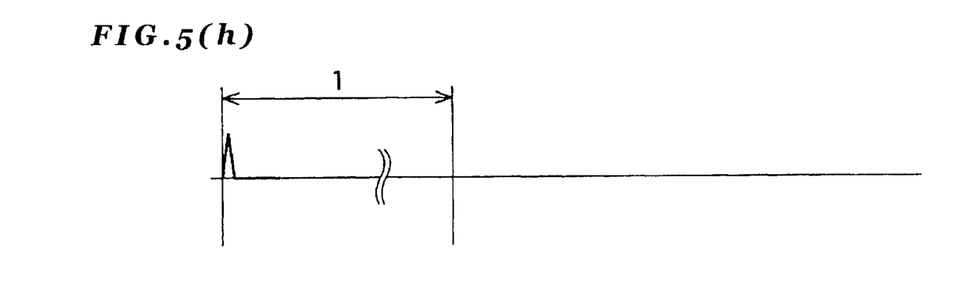

In the GPS of the present embodiment, detailed phase inversion information (FIG. 5(E)) of the navigation message in synchronization with intermediate frequency signal sample data is provided to the GPS receiver (rover) 30 from the base station 20. Based on the phase inversion information of the navigation message, the GPS receiver (rover) 30 performs phase correction of the intermediate frequency signal sample data (FIG. 5(F)). After the phase correction, it becomes possible to perform the phase integration for all of the obtained intermediate frequency signal sample data (FIG. 5(G)). The phase integration provides a SN ratio improved more significantly than the power integration (FIGS. 5(G) and 5(H)). Therefore, the processing for improving sensitivity with such an extremely high efficiency that cannot be attained by a conventional technique is provided. In addition, since, while the correlation processing is performed on each of the phase integration blocks according to the conventional technique for improving sensitivity, the computation-intensive correlation processing is performed only once after the phase integration according to the technique of the present invention, a computation load and power consumption can also be reduced.

As shown in FIG. 2, the base station 20 includes a high frequency unit 21, an A/D converter unit 22, a pseudonoise demodulation unit 23, a navigation message restoration unit 24, a memory unit 25, and a communication unit 26.

The high frequency unit 21 down-converts the GPS signal 11 to output the intermediate frequency signal 121. The A/D converter unit 22 samples the intermediate frequency signal 121 and stores the signal in the memory unit 25. The memory unit 25 stores an object of an intermediate frequency signal sample data 131 which simultaneously represents all signal information of visible satellites, a navigation message bit sequence, and an analysis result of the navigation message in respective segments.

The pseudonoise signal demodulation unit 23 correlates the intermediate frequency signal sample data 131 stored in the memory unit 25 with a code specific to each satellite that is a subject of reception, extracts a data bit sequence of the navigation message for each point in time, and stores it in the memory unit 25 together with a time stamp thereof.

The navigation message restoration unit 24 restores all constants and variables constituting a navigation message from the navigation message bit sequence for each of the GPS satellites stored in the memory unit 25 based on a format of the navigation message and stores the navigation message into the memory unit 25. In this regard, if a navigation message has been already stored in the memory unit 25, the navigation message is overwritten to be kept up to date.

The communication unit 26 transmits the GPS receiver (rover) supporting data generated in the pseudonoise demodulation unit 23 and the navigation message restoration unit 24 and stored in the memory unit 25 to the GPS receiver (rover) 30 via the communication line 40 in response to a request from the GPS receiver (rover) 30.

As shown in FIG. 3, the GPS receiver (rover)30 includes a high frequency unit 31, an A/D converter unit 32, a memory unit 33, a communication unit 34, an integration unit 35, and a GPS computation unit 36.

The high frequency unit 31 down-converts the GPS signal 11 to form a intermediate frequency signal 122. The A/D converter unit 32 samples the intermediate frequency signal 122 and stores the signal in the memory unit 33. The communication unit 34 determines a sampling start time with the support of the base station 20. The communication unit 34 also acquires the phase information of the signal from each of the satellites 10 from the base station 20.

The integration unit 35 integrates the navigation message date stored in the memory unit 33 after performing the phase correction thereon based on the phase information for each of the satellites 10. The integration is performed for all of the satellites listed in a satellite selection list provided by the base station 20, and the result thereof is stored in the memory unit 33.

The GPS computation unit 36 performs a correlation computation on the result of the integration stored in the memory unit 33 to GPS receiver (rover) 30.

As shown in FIG. 4, the integration unit 35 includes a processing end determination unit 51, a phase correction information acquisition unit 52, an epoch length computation unit 53, a phase correction unit 54, a Doppler frequency computation unit 55, a frequency correction unit 56, and an addition unit 57. In this regard, each of these functional units 51 to 57 is implemented by software (program control) with a CPU.

Upon being started, a process enters into a next loop by referring to a "satellite selection list for processing" that is generated by the base station 20, transmitted to the GPS receiver (rover) 30, and stored in the memory unit 33.

The processing end determination unit 51 determines whether the signals from all of the satellites listed in the satellite selection list for processing have been already integrated, and, if the integration has not been completed for the signals from all of those satellites, performs a next integration. If the integration is completed, the processing in the integration unit 35 is ended, and then the process enters into a positioning computation processing in the GPS computation unit 36.

In the phase correction information acquisition unit 52, the phase correction information of a signal to be integrated (FIG. 5(E)) is read out from the memory unit 33. The memory unit 33 previously stores the phase correction information provided by the base station 20.

The epoch length computation unit 53 computes an epoch length of a satellite signal based on orbit information of a satellite included in the navigation message information from the memory unit 33. The epoch length is precisely 1 ms when the signal is transmitted from the satellite. When the signal is received, however, it differs from 1 ms due to the Doppler effect resulting from a relative velocity between the satellite and the observer.

In the phase correction unit 54, the phase correction is performed according to the phase correction information read out from the memory unit 33 to eliminate the phase inversion resulting from the navigation message of the intermediate frequency signal sample data.

In the Doppler frequency computation unit 55, the value of the Doppler shift resulting from the relative velocity between the satellite to be processed 10 and the GPS receiver (rover) 30.

In the frequency correction unit 56, a correction is performed on the intermediate frequency signal sample data to eliminate a phase rotation resulting from the Doppler frequency and a local clock frequency error of the system.

In the addition unit 57, after the intermediate frequency signal sample data is divided into pieces each of which is 1 epoch long, the pieces are added together to form one epoch of data, and the data is stored in the memory unit 33 as an output of the phase integral for the satellite currently concerned. The output of the phase integral is used later by the GPS computation unit 36 for performing the positioning computation.

The processing end determination unit 51 determines whether the phase integration is completed for all the selected satellite codes. If the phase integration is not completed, the same operation is performed on a pseudonoise code of the next satellite. If the phase integration is completed, the phase integration is ended, and then the process shifts to the positioning computation.

In this embodiment, a configuration has been described in which the base station 20 and the GPS receiver (rover) 30 are connected to each other via the communication line 40. The communication line 40 may be a network such as the Internet, a mobile phone network, or applied broadcast information.

The GPS according to the present embodiment may be configured as a server-client system in which the GPS receiver (rover) 30 is a client and the base station is a server.

The distribution of the processing among the server base station 20 and the client GPS receiver (rover) 30 can be changed with a certain degree of flexibility to serve different applications. For example, the intermediate frequency signal sample data 132, which is obtained by sampling the intermediate frequency signal 122 obtained in the GPS receiver (rover) 30, in the A/D converter 32 may be transmitted to the base station 20 so that the integration thereof is performed in the base station 20 and then the result of the integration is transmitted to the GPS receiver (rover) 30 via the communication line 40.

In short, the base station 20 continuously receives the GPS signal 11 and extracts therefrom information for supporting reception and positioning computation in the GPS receiver 30 and retains the information. The base station 20 transmits the support information to the GPS receiver 30 via the communication line 40 when the GPS receiver needs the information. The base station 20 supports reception time synchronization in the GPS receiver 30. The GPS receiver 30 receives the GPS signal 11, generates an intermediate frequency signal through down-conversion, and then stores the A/D conversion data in the memory unit. In the GPS receiver 30, the GPS signal data stored in the memory unit 33 is subjected to integration with the phases of the GPS signals aligned based on the support information (satellite navigation message and phase inversion information) supplied from the base station 20, and then positioning computation is performed using the integral GPS data in the GPS receiver 30. In this way, by compensating the phase inversion of the navigation message and performing the phase integration over a long period, the positional information can be provided even if the signal intensity of the received GPS signal is low.

As described above, with the GPS and GPS receiver according to the present invention, the satellite navigation message and phase inversion information required for performing the phase integration are supplied from the base station to the GPS receiver, and the GPS receiver corrects the phase inversion of the navigation message to allow the received GPS signal (pseudonoise signal) to be integrated over a long period of time, so that the sensitivity of the GPS receiver can be improved. As a result, the positional information can be provided even if the signal intensity of the received GPS signal is low.

The data obtained by sampling the intermediate frequency signal of the GPS signal can be phase-integrated, from its beginning to its end, over a period of time in seconds that is significantly longer than a conventional time of several tens milliseconds. As a result, the SN ratio of the signal can be effectively improved.

Since the power integration is not performed, the process for improving sensitivity does not require any correlation computation. As a result, the computation load involved in the process for improving sensitivity can be significantly reduced compared with the case where the power integration is performed, and therefore, power consumption can be reduced.

Since the GPS receiver is not required to acquire the phase inversion of the pseudonoise signal of the navigation message, the process for improving sensitivity can be carried out at any site where the GPS receiver can communicate with the base station.

The invention maybe embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-386585 (Filed on Dec. 20$^{th}$, 2000) including specification, claims, drawings and summary are incorporated herein by reference in its entirety.

What is claimed is:

1. A global positioning system (GPS) receiver, comprising:
    a high frequency unit for frequency-converting a received GPS signal to output an intermediate frequency signal;
    an A/D converter unit for A/D converting said intermediate frequency signal to output an intermediate frequency signal sample data;
    a memory unit for storing said intermediate frequency signal sample data for a predetermined period of time, the data being associated with a time series;
    a communication unit for communicating with a base station;
    an integration unit for subjecting said intermediate frequency signal sample data stored in said memory unit to a phase correction based on phase inversion information of a navigation message supplied from said base station, and then performing a phase integration on all of said intermediate frequency signal sample data for the predetermined period of time to output a result of the phase integration; and
    a GPS computation unit for computing positional information based on said result of the phase integration.

2. A global positioning system (GPS), comprising:
    a GPS receiver including, a high frequency unit for frequency-converting a received GPS signal to output an intermediate frequency signal, an A/D converter unit for A/D converting said intermediate frequency signal to output an intermediate frequency signal sample data, a memory unit for storing said intermediate frequency signal sample data for a predetermined period of time, the data being associated with a time series, a communication unit for communicating with a base station, an integration unit for subjecting said intermediate frequency signal sample data stored in said memory unit to a phase correction based on phase inversion information of a navigation message supplied from said base station, and then performing a phase integration on all of said intermediate frequency signal sample data for the predetermined period of time to output a result of the phase integration, and a GPS computation unit for computing positional information based on said result of the phase integration; and
    the base station for providing the phase inversion information of the navigation message and information for supporting a positioning computation to the GPS receiver.

3. The global positioning system according to claim 2, wherein said GPS receiver automatically determines said integration process time for the least necessary length in accordance with GPS signal conditions.

4. The global positioning system according to claim 2, wherein said GPS receiver operates said integration process only when it is necessary in accordance with GPS signal conditions.

5. The global positioning system according to claim 2, wherein said GPS integration process is provoked only when it is considered to be the best cost-effective among other hi-sensitive GPS algorithms or generic GPS algorithm.

6. The global positioning system according to claim 2, wherein said GPS receiver and said base station are connected to each other via the Internet.

7. The global positioning system according to claim 2, wherein said GPS receiver and said base station are connected to each other via a mobile phone network.

8. The global positioning system according to claim 2, wherein said GPS receiver and said base station are connected to each other via the Internet and a mobile phone network.

9. The global positioning system according to claim 2, wherein a server-client system is adopted in which said GPS receiver is a client and said base station is a server.

10. The global positioning system according to claim 6, wherein a server-client system is adopted in which said GPS receiver is a client and said base station is a server.

11. The global positioning system according to claim 7, wherein a server-client system is adopted in which said GPS receiver is a client and said base station is a server.

12. The global positioning system according to claim 8, wherein a server-client system is adopted in which said GPS receiver is a client and said base station is a server.

13. A computer program product stored in a computer-readable recording medium that is used in a GPS receiver, wherein the computer program product makes a computer execute the process of:
  frequency-converting a received GPS signal to output an intermediate frequency signal;
  A/D converting said intermediate frequency signal to output intermediate frequency signal sample data;
  storing said intermediate frequency signal sample data for a predetermined period of time in a memory unit, the data being associated with a time series;
  communicating with a base station and subjecting said intermediate frequency signal sample data stored in said memory unit to a phase correction based on phase inversion information of a navigation message supplied from said base station;
  performing a phase integration on all of said intermediate frequency signal sample data for the predetermined period of time to output a result of the phase integration; and
  computing positional information based on said result of the phase integration.

\* \* \* \* \*